(12) United States Patent
Prieto

(10) Patent No.: US 7,562,457 B2
(45) Date of Patent: Jul. 21, 2009

(54) FOAM CUTTER BLADE ATTACHMENT DEVICE

(75) Inventor: Rodolfo D. Prieto, Clearwater, FL (US)

(73) Assignee: Acu-Cutter Corp., Clearwater, FL (US)

( * ) Notice: Subject to any disclaimer, the term of this patent is extended or adjusted under 35 U.S.C. 154(b) by 331 days.

(21) Appl. No.: 11/557,375

(22) Filed: Nov. 7, 2006

(65) Prior Publication Data

US 2008/0104852 A1 May 8, 2008

(51) Int. Cl.
*B23D 49/16* (2006.01)
*B27B 19/09* (2006.01)
*B27B 11/10* (2006.01)

(52) U.S. Cl. .............................. 30/392; 30/273; 30/369
(58) Field of Classification Search .................... 30/273, 30/277.4, 369, 392
See application file for complete search history.

(56) References Cited

U.S. PATENT DOCUMENTS

| | | | | | |
|---|---|---|---|---|---|
| 2,623,283 | A | * | 12/1952 | Godfrey et al. | ............... 30/216 |
| 2,659,969 | A | * | 11/1953 | Merkur | ......................... 30/369 |
| 2,914,099 | A | * | 11/1959 | Kaufmann | .................... 30/369 |
| 2,966,178 | A | * | 12/1960 | Katzfey | ....................... 83/779 |
| 3,270,369 | A | * | 9/1966 | Mandell | ..................... 452/160 |
| 3,496,972 | A | * | 2/1970 | Rees | .......................... 30/376 |
| 3,537,490 | A | * | 11/1970 | Shaw et al. | ................... 30/394 |
| 3,863,342 | A | | 2/1975 | Griffies et al. | |
| 3,942,251 | A | | 3/1976 | Griffies et al. | |
| 3,971,132 | A | | 7/1976 | Griffies et al. | |
| 3,994,065 | A | | 11/1976 | Plum | |
| 2005/0144791 | A1 | * | 7/2005 | Ritter et al. | ................... 30/392 |

FOREIGN PATENT DOCUMENTS

GB         2042973        * 10/1980

* cited by examiner

*Primary Examiner*—Hwei-Siu C Payer
(74) *Attorney, Agent, or Firm*—QuickPatents, Inc.; Kevin Prince

(57) ABSTRACT

An improvement for a reciprocal saw is disclosed, the saw being of the type having an oscillating drive shaft and a counter weight that oscillates in opposing phase to the drive shaft for the purpose of reducing vibration. The improvement comprises a lateral extension arm fixed to the counter weight and projecting generally towards the drive shaft. The extension arm is connected to a mounting plate that projects generally parallel to the drive shaft towards the distal end of the drive shaft, such that when the saw is activated the drive shaft oscillates oppositely, but in parallel, to the mounting plate. A mounting cover is fixed to the mounting plate with a fastener and includes a channel therein formed generally longitudinally parallel to the drive shaft and adapted to capture both a first saw blade slidably therein and a second saw blade fixedly therein. The first saw blade is fixed to a blade mounting post of the drive shaft and the second saw blade is fixed to the mounting plate with a blade mounting post thereof. Each blade further includes a slot and slid pin for keeping the distal ends of the blades in close sliding mutual contact.

11 Claims, 4 Drawing Sheets

FOAM CUTTER BLADE ATTACHMENT DEVICE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to reciprocal saws, and more particularly to an improvement for a reciprocal saw for facilitating the cutting of foam material, or the like.

DISCUSSION OF RELATED ART

Prior art reciprocal saws, also known as saber saws, are well suited for cutting a variety of materials. U.S. Pat. No. 3,863,342 to Griffies et al. on Feb. 4, 1975, and its related divisional patents, teach such a saw. Such devices include a counterweight within a housing thereof for reducing vibration caused by an oscillating drive shaft and blade. However, when cutting foam rubber, polyfoam, sponge, or other resilient materials, the single blade of such conventional devices often stick in the material, resulting in the material oscillating with the blade instead of being cut.

Several prior art devices have been designed to cut such foam materials and solve the aforementioned difficulties associated therewith. For example, U.S. Pat. No. 3,994,065 to Plum on Nov. 30, 1976, teaches a single-blade device with a base that compresses and confines the material in the vicinity of the cutting portion of the blade. Such a device, however, is not nearly as effective as a more expensive saw that includes a double blade arrangement. However, the double bladed saw marketed by Bosch as a "Foam Rubber Cutter" model number 1575A, includes a complicated gearing system and as such is quite expensive. As such, to this date there is still no cost-effective solution for easily cutting foam-type materials easily and reliably.

Therefore, there is a need for an inexpensive foam-material cutting device that is easy to use. Such a needed device could be quickly installed in existing reciprocal saws or could be sold with the saw as original equipment. Changing saw blades in such a device would be relatively easy and, such a device would not weigh more or be more difficult to operate than a conventional saber saw. The present invention accomplishes these objectives.

SUMMARY OF THE INVENTION

The present device is an improvement for a reciprocal saw of the type having an oscillating drive shaft and a counter weight that oscillates in opposing phase to the drive shaft for the purpose of reducing vibration. The improvement of the present invention comprises a lateral extension arm fixed to the counter weight and projecting generally towards the drive shaft. The extension arm terminates is connected to a mounting plate that projects generally parallel to the drive shaft towards the distal end of the drive shaft, such that when the saw is activated the drive shaft oscillates oppositely, but in parallel, to the mounting plate.

A mounting cover is fixed to the mounting plate with a mounting means, such as threaded screw fasteners. The mounting cover includes a channel therein formed generally longitudinally parallel to the drive shaft. The channel is adapted to capture both a first saw blade slidably therein and a second saw blade fixedly therein. The first saw blade is fixed to a blade mounting means of the drive shaft, preferably a projecting post that cooperates to fixedly receive a notch formed in the first blade. The second saw blade is fixed to the mounting plate with a blade mounting means, preferably a projecting post that cooperates to fixedly receive a notch formed in the first blade.

Each blade further includes a blade fixing means for keeping the distal ends of the blades in close sliding mutual contact. The blade fixing means is preferably a slide pin that traverses blade slots to hold each blade in mutual slidable contact at the distal ends thereof. A blade guide may be fixed to the pin and extend upward to be fixed to the saw.

The present invention is an inexpensive foam-material cutting device that is easy to use. Such a needed device can be quickly installed in existing reciprocal saws or can be sold with the saw as original equipment. Changing saw blades in such a device is relatively easy, and the present device does not weigh considerably more than and is not more difficult to operate than a conventional saber saw. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1A:
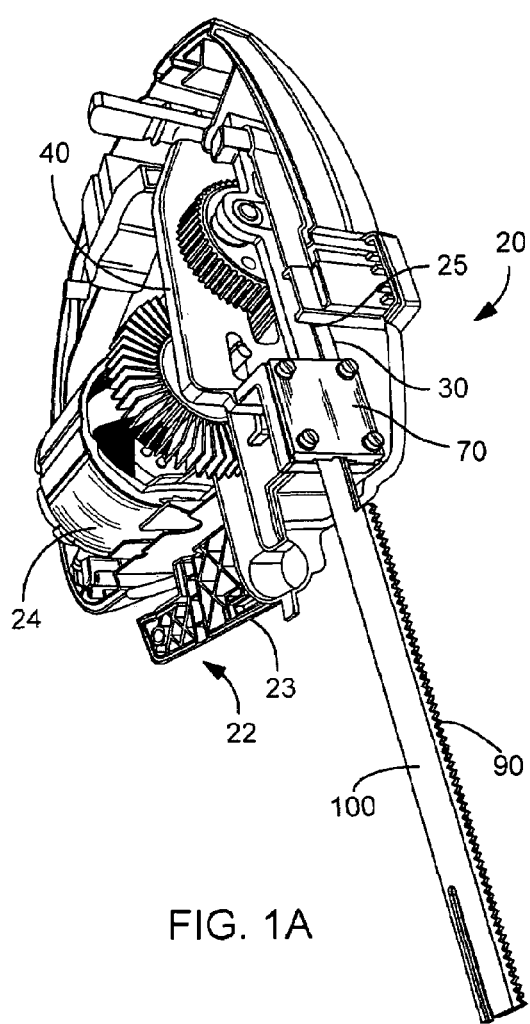
FIG. 1A is a partially broken-away perspective view of the invention, illustrating an improvement to a reciprocal saw.
Figure 1B:
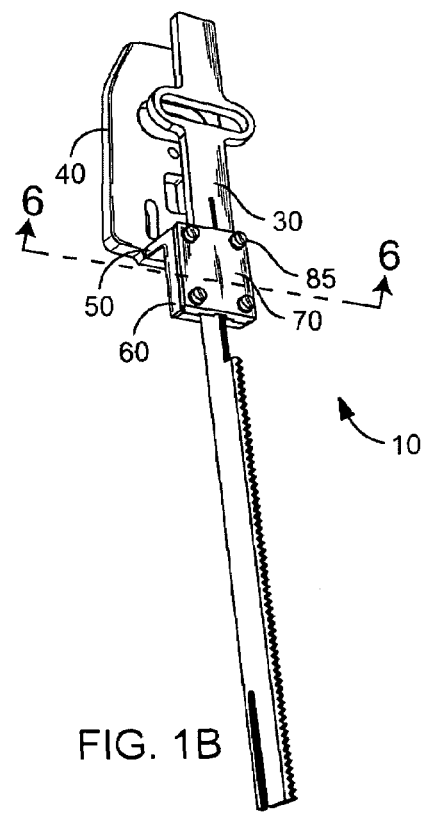
FIG. 1B is a partial perspective view of the invention, illustrating an improved counter weight and drive shaft of the invention, both for securing two saw blades in mutual close slidable proximity.
Figure 1C:
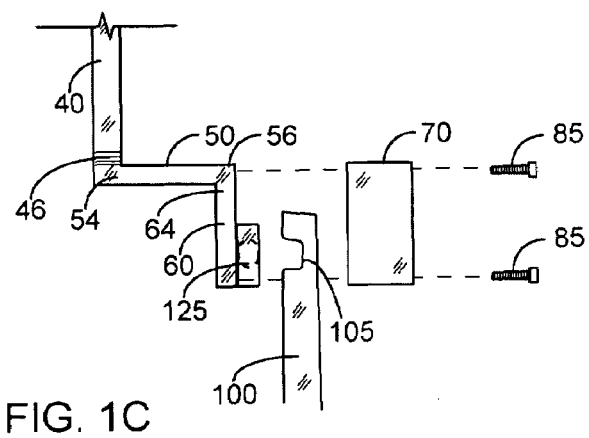
FIG. 1C is a partial, exploded side elevational view of the counter weight and a mounting cover of the invention.

FIGS. 1A and 1B illustrate an improvement 10 for a reciprocal saw 20 of the type having an oscillating drive shaft 30 having a distal end 36, and a counter weight 40 having a distal end 46 (FIG. 1C). The counter weight 40 in such a saw 20 oscillates in opposing phase to the drive shaft 30 for the purpose of reducing vibration when the saw 20 is in use. The counter weight 40 is typically slidably supported within a housing 23 that further encloses a reciprocal saw mechanism 22 that converts rotational motion of a drive motor 24 into reciprocal motion of the drive shaft 30. The drive shaft 30 protrudes from and oscillates up and down within a first aperture 25 in the housing 23 (FIG. 2C).

The improvement 10 of the present invention comprises a lateral extension arm 50 fixed at a proximal end 54 thereof to the distal end 46 of the counter weight 40 and projecting generally towards the drive shaft 30. As such, the extension arm 50 traverses a second aperture 26 (FIG. 2C) in the housing 23 generally behind the drive shaft 30. The extension arm 50 terminates at a distal end 56, which is connected to the proximal end 64 of a mounting plate 60. The mounting plate 60 projects generally parallel to the drive shaft 30 towards the distal end 36 of the drive shaft 30, such that when the drive motor 24 is activated the drive shaft 30 oscillates oppositely, but in parallel, to the mounting plate 60. The extension arm 50 and mounting plate 60 are preferably integrally formed with the counter weight 40, but may also be fixed thereto by welding, bolts, or other suitably strong attachment means (not shown). The drive shaft 30, counter weight 40, extension arm 50, and mounting plate 60 are all preferably formed from a rigid and strong metal material, such as rolled steel.

Figure 4:
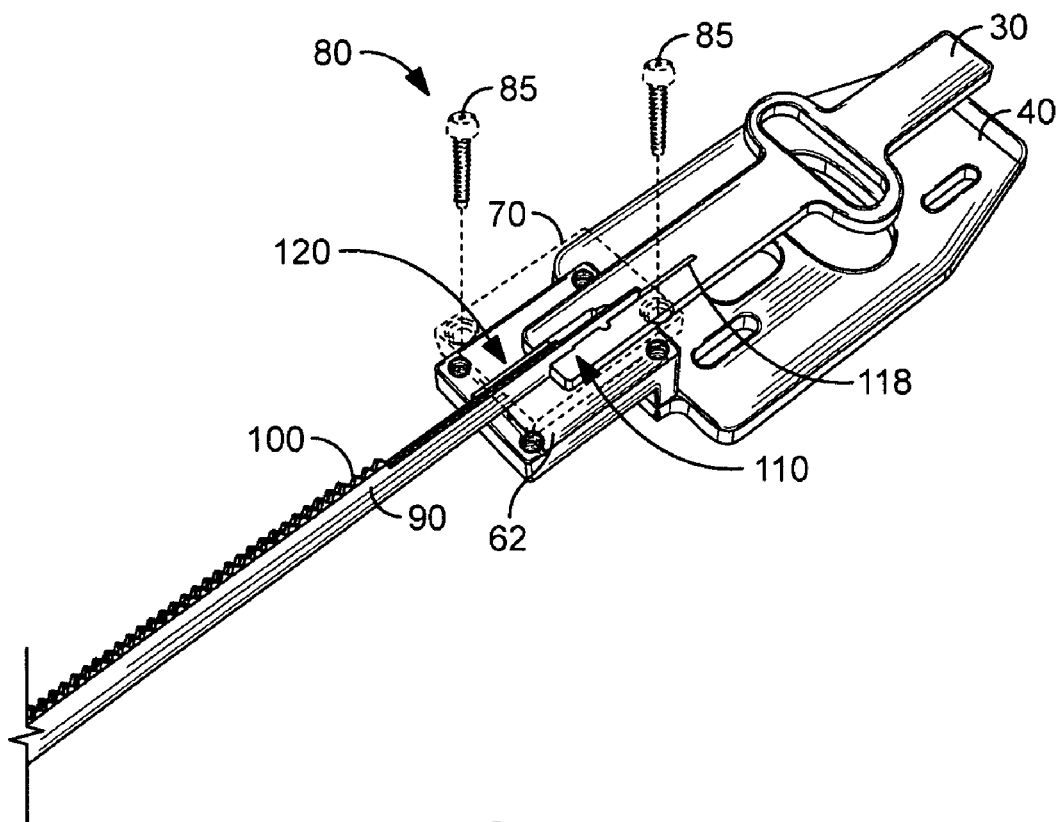
FIG. 4 is a partial exploded view of the improvement of the invention illustrating the first saw blade in a retracted position with respect to the second saw blade.
Figure 6:
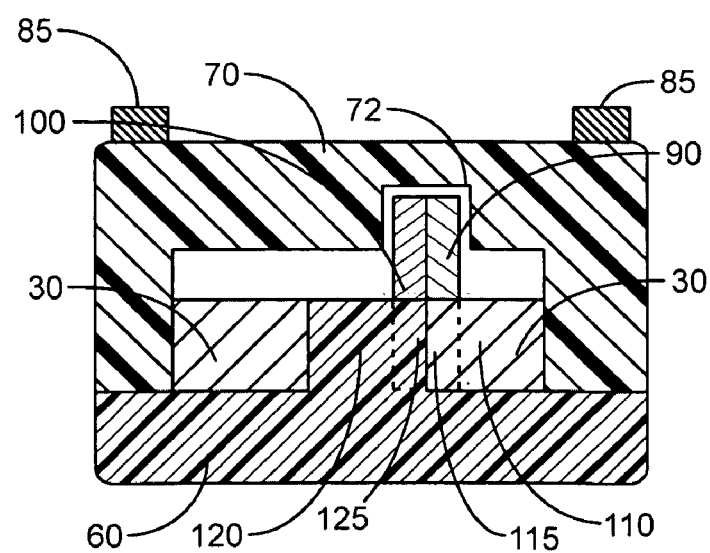
FIG. 6 is a cross-sectional view of the invention, taken generally along lines 6-6 of FIG. 1B.

A mounting cover 70 is fixed to a front side 62 of the mounting plate 60 with a mounting means 80, such as threaded screw fasteners 85 (FIGS. 4 and 6). The mounting cover 70 includes a channel 72 therein formed generally longitudinally parallel to the drive shaft 30. The channel 72 is adapted to capture both a first saw blade 90 slidably therein and a second saw blade 100 fixedly therein. The mounting cover 70 is preferably formed from a rigid metal such as steel or aluminum, but could also be formed from a suitably rigid plastic or resin material, provided that it is able to withstand the forces exerted thereto by the saw blades 90,100. The mounting means 80 may be any other suitable mounting means, such as a plurality of rigid clips (not shown), a rigid sleeve (not shown), or the like.

Figure 2A:
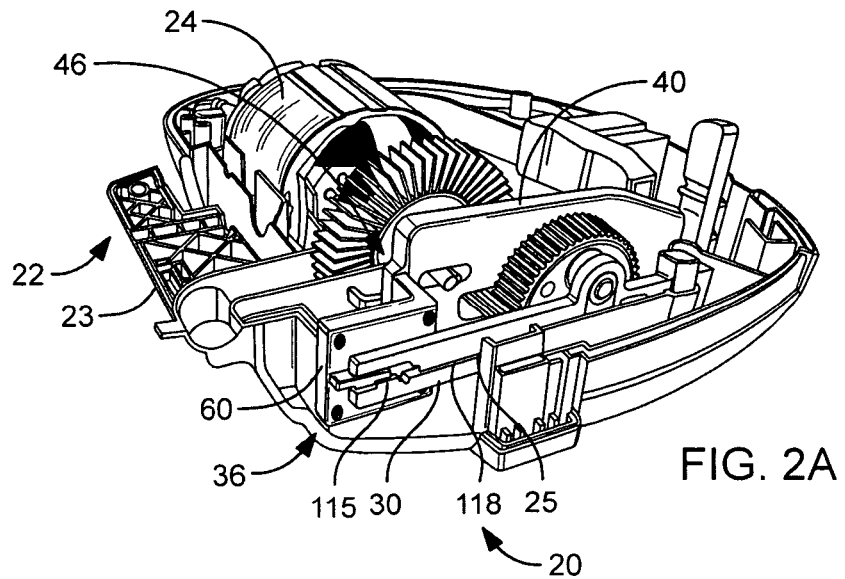
FIG. 2A is a partially broken-away perspective view of the invention, illustrating in more detail the counter weight and drive shaft of the reciprocal saw.
Figure 2B:
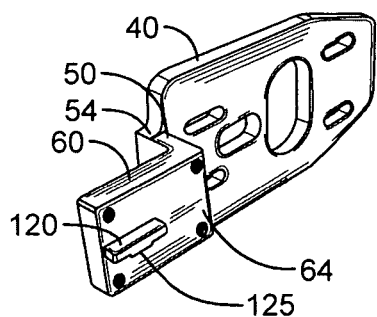
FIG. 2B is a partially perspective view of the invention, illustrating in more detail the counter weight of the reciprocal saw.
Figure 2C:
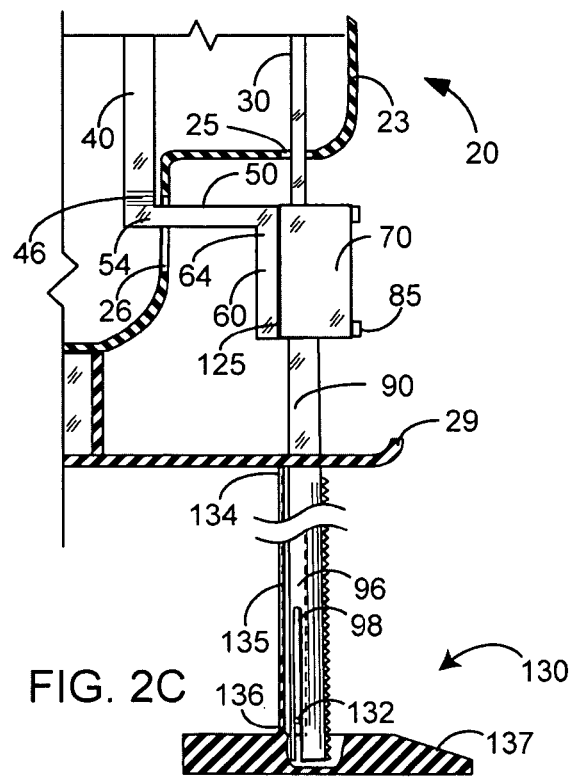
FIG. 2C is a cross-sectional view of a foot of the invention, illustrating distal ends of two blades of the invention held together by a blade fixing means.
Figure 3:
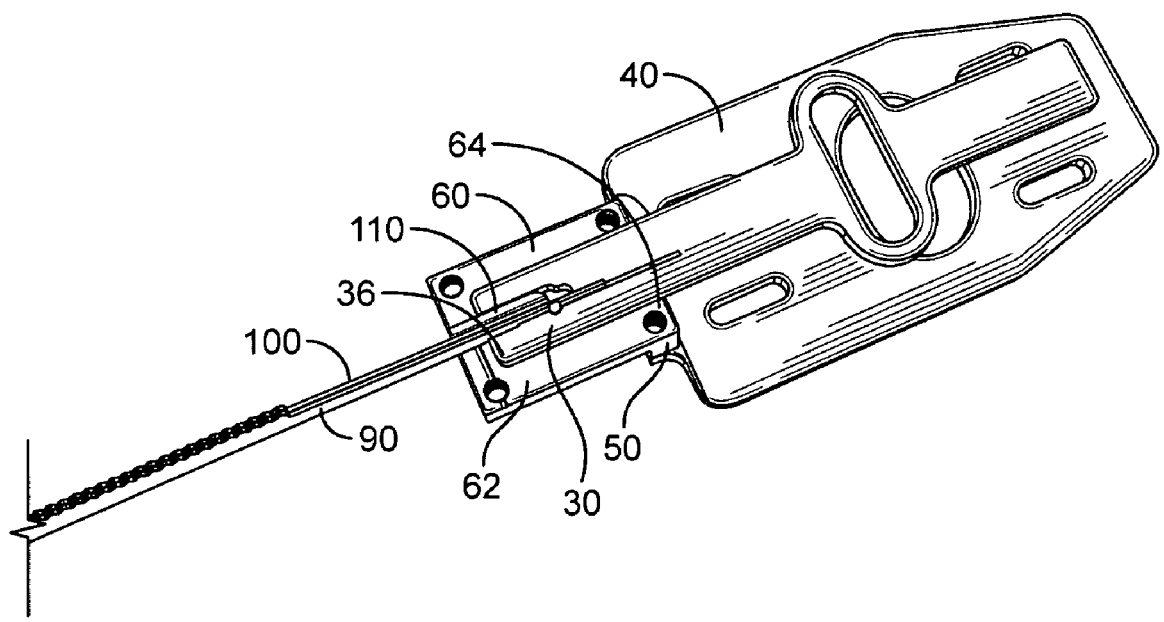
FIG. 3 is a close-up perspective view of the improvement to the counter weight and drive shaft of the present invention, illustrating a first saw blade in an extended position with respect to a second saw blade.
Figure 5:
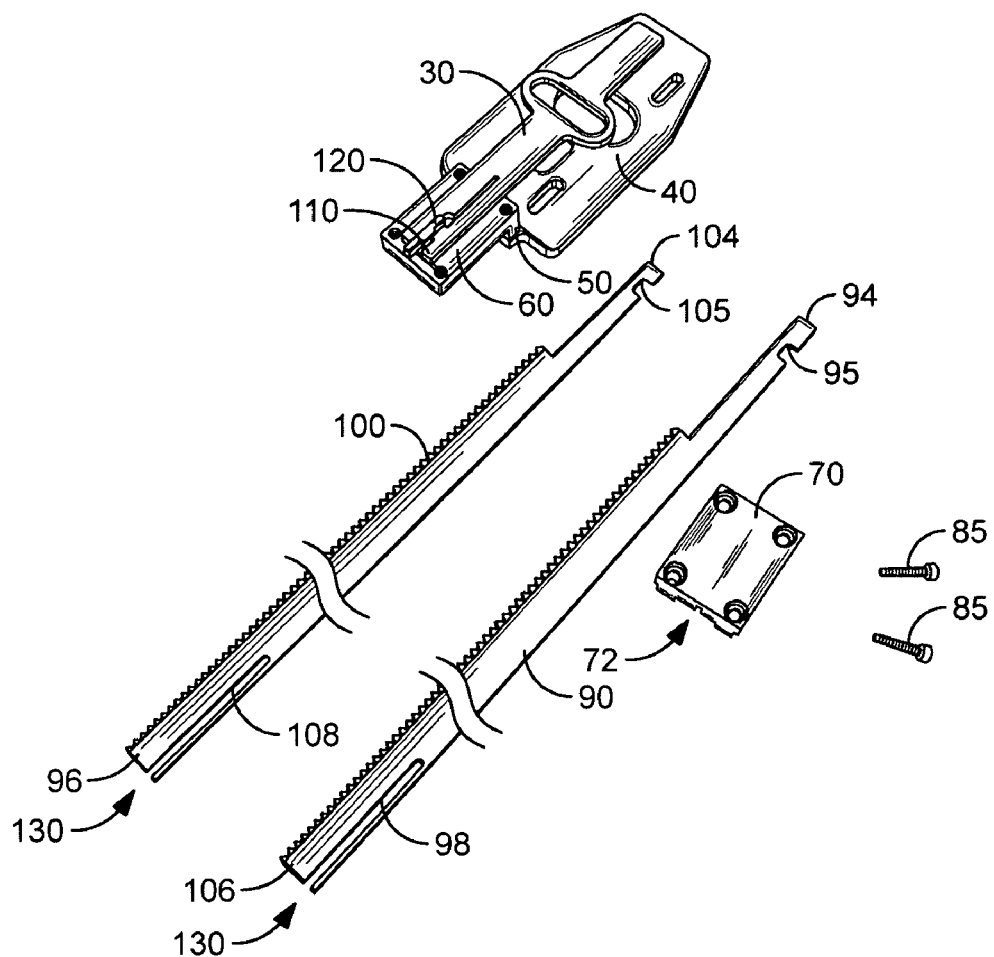
FIG. 5 is an exploded view of the improvement of the invention.

The first saw blade 90 is fixed to a blade mounting means 110 of the drive shaft 30, preferably a projecting post 115 that cooperates to fixedly receive a notch 95 formed in a proximal end 94 of the first blade 90 (FIGS. 2A and 5). The second saw blade 100 is fixed to the mounting plate 60 with a blade mounting means 120, preferably a projecting post 125 (FIG. 2B) that cooperates to fixedly receive a notch 105 formed in a proximal end 104 of the first blade 100 (FIG. 1C).

As the projecting posts 115,125 each face each other and are in close mutual sliding proximity with each other, the saw blades 90,100 are likewise fixed in close mutual sliding proximity. The channel 72 of the mounting cover captures the blades 90,100 between the mounting plate 60 and the mounting cover 70, such that the first blade 90 is fixed to and moves with the drive shaft 30, slidably captured within the channel 72 of the mounting cover 70 and between the mounting cover 70 and the mounting plate 60. Likewise, the second blade 100 is fixed between and moves with the mounting plate 60 and the mounting cover 70, fixedly captured within the channel 72 of the mounting cover 70 and in close sliding, parallel contact with the first blade 90. A slot 118 in the drive shaft 30 receives the proximal end 94 of the first blade 90 (FIG. 2A).

The projecting posts 115,125 and the notches 95,105, as shown, are preferably rectangular in shape. However, any suitable shape would operate in an equivalent manner, and indeed the blades 90,100 may be provided with projections and the mounting plate 60 and drive shaft 90 may be provided with cooperating notches (not shown) to result in an equivalent effect. Any structure will suffice if it provides for the blades 90,100 mechanically cooperating with the drive shaft 30, the counterweight 40, the mounting plate 60, and the mounting cover 70 to achieve oppositely phased blade movement with the blades 90,100 being in close mutual slidable contact.

Each blade 90,100 further includes a blade fixing means 130, such as longitudinal slots 98,108 formed in distal ends 96,106 thereof (FIG. 5), for keeping the distal ends 96,106 in close sliding mutual contact. The blade fixing means 130 preferably includes a slide pin 132 that traverses the slots 98,108 and holds each blade 90,100 in mutual slidable contact at the distal ends 96,106 thereof. A blade guide 135 may be fixed to the pin 132 at a distal end 136 thereof and fixed to the saw 20 at a proximal end 134 thereof (FIG. 2C), such as at a saw guide 29 of the saw 20. The blade guide 135 may terminate at its distal end 136 at a foot 137 that guides a material to be cut (not shown) into the blades 90,100, as is common in the art.

While a particular form of the invention has been illustrated and described, it will be apparent that various modifications can be made without departing from the spirit and scope of the invention. For example, the improvement 10 may be offered separately to users having such a reciprocal saw 20, or may be built into such a saw 20 as original equipment. Likewise, a blade mounting plate 60 and mounting cover 70 having a different form than described and shown may be used, provided that both blades 90,100 are held in mutual close slidable contact. Accordingly, it is not intended that the invention be limited, except as by the appended claims.

What is claimed is:

1. An improvement for a reciprocal saw of the type having an oscillating drive shaft having a distal end, and a counter weight having a distal end and oscillating in opposing phase to the drive shaft, the drive shaft and the counter weight laterally displaced and generally parallel, the improvement comprising:

a lateral extension arm fixed at a proximal end thereof to the distal end of the counter weight, the lateral extension arm projecting generally towards the drive shaft and terminating at a distal end;

a mounting plate fixed at a proximal end thereof to the distal end of the lateral extension arm, the mounting plate projecting generally parallel to the drive shaft and towards the distal end of the drive shaft;

a mounting cover fixed to a front side of the mounting plate with a mounting means, the mounting cover including a channel therein formed generally longitudinally parallel to the drive shaft, the channel adapted to capture both a first saw blade slidably therein and a second saw blade fixedly therein with a blade mounting means of the mounting plate, the first saw blade fixed to a blade mounting means of the drive shaft, each blade being mutually slidably fixed at distal ends thereof with a blade fixing means;

whereby the saw drives the first saw blade in one direction while driving the second saw blade in an opposite direction, the first and second saw blades being in close mutual slidable contact.

2. The improvement of claim 1 wherein the mounting means are each screw fasteners.

3. The improvement of claim 1 wherein the blade fixing means is a slide pin that traverses a longitudinal slot formed in the distal ends of each blade to hold each blade in mutual slidable contact.

4. The improvement of claim 3 further including a blade guide fixed to the pin, the blade guide fixed to the reciprocal saw.

5. The improvement of claim 1 wherein the blade mounting means of the mounting plate is a projecting post that cooperates to fixedly receive a notch formed in a proximal end of the second blade, and wherein the blade mounting means of the drive shaft is a projecting post that cooperates to fixedly receive a notch formed in a proximal end of the first blade, and wherein the mounting cover captures the first blade around the projecting post of the drive shaft and captures the second blade around the projecting post of the mounting plate.

6. A reciprocal saw comprising:
a reciprocal saw mechanism having a housing, a drive motor mechanically connected to an oscillating counter weight having a distal end and an oscillating drive shaft having a distal end projecting through a first aperture in the housing, the counter weight oscillating in opposing phase to the drive shaft, the drive shaft and the counter weight laterally displaced and generally parallel;
a lateral extension arm fixed at a proximal end thereof to the distal end of the counter weight, the lateral extension arm projecting generally towards the drive shaft through a second aperture in the housing and terminating at a distal end;
a mounting plate fixed at a proximal end thereof to the distal end of the lateral extension arm, the mounting plate projecting generally parallel to the drive shaft and towards the distal end of the drive shaft;
a mounting cover fixed to a front side of the mounting plate with a mounting means, the mounting cover including a channel therein formed generally longitudinally parallel to the drive shaft, the channel adapted to capture both a first saw blade slidably therein and a second saw blade fixedly therein with a blade mounting means of the mounting plate, the first saw blade fixed to a blade mounting means of the drive shaft, each blade being mutually slidably fixed at distal ends thereof with a blade fixing means;
whereby the saw drives the first saw blade in one direction while driving the second saw blade in an opposite direction, the first and second saw blades being in close mutual slidable contact.

7. The reciprocal saw of claim 6 wherein the mounting means are each screw fasteners.

8. The reciprocal saw of claim 6 wherein the blade fixing means is a slide pin that traverses a longitudinal slot formed in the distal ends of each blade to hold each blade in mutual slidable contact.

9. The reciprocal saw of claim 8 further including a blade guide fixed to the pin, the blade guide fixed to the reciprocal saw.

10. The reciprocal saw of claim 6 wherein the first and second apertures of the housing are combined as a single aperture.

11. The reciprocal saw of claim 6 wherein the blade mounting means of the mounting plate is a projecting post that cooperates to fixedly receive a notch formed in a proximal end of the second blade, and wherein the blade mounting means of the drive shaft is a projecting post that cooperates to fixedly receive a notch formed in a proximal end of the first blade, and wherein the mounting cover captures the first blade around the projecting post of the drive shaft and captures the second blade around the projecting post of the mounting plate.

\* \* \* \* \*